United States Patent [19]
Swartz et al.

[11] Patent Number: 5,247,162
[45] Date of Patent: * Sep. 21, 1993

[54] PORTABLE LASER DIODE SCANNING HEAD HAVING A FOCUSING LENS AND AN APERTURE

[75] Inventors: Jerome Swartz, Setauket; Howard M. Shepard, Great River, both of N.Y.; Eric F. Barkan, San Francisco, Calif.; Mark J. Krichever, Hauppauge, N.Y.; Boris Metlitsky, Hauppauge, N.Y.; Edward Barkan, South Setauket, N.Y.; Alexander M. Adelson, Peekstill, N.Y.

[73] Assignee: Symbol Technologies, Inc., Bohemia, N.Y.

[ * ] Notice: The portion of the term of this patent subsequent to Mar. 28, 2006 has been disclaimed.

[21] Appl. No.: 690,705

[22] Filed: Apr. 24, 1991

Related U.S. Application Data

[60] Continuation of Ser. No. 454,144, Dec. 21, 1989, Pat. No. 5,021,641, which is a division of Ser. No. 295,151, Jan. 9, 1989, Pat. No. 4,897,532, which is a continuation of Ser. No. 148,669, Jan. 26, 1988, Pat. No. 4,825,057, which is a division of Ser. No. 706,502, Feb. 28, 1985, abandoned.

[51] Int. Cl.$^5$ .............................................. G06F 7/10
[52] U.S. Cl. .................................. 235/467; 235/472; 359/214
[58] Field of Search ................... 235/467, 472; 359/214

[56] References Cited

U.S. PATENT DOCUMENTS

| | | | |
|---|---|---|---|
| 4,019,026 | 4/1977 | Nakanishi et al. | 235/467 |
| 4,034,230 | 7/1977 | Brill et al. | 235/467 X |
| 4,560,862 | 12/1985 | Eastman et al. | 235/472 X |
| 4,603,262 | 7/1986 | Eastman et al. | 235/472 X |
| 4,816,660 | 3/1989 | Swartz et al. | 235/467 X |
| 4,835,374 | 5/1989 | Swartz et al. | 235/467 X |

OTHER PUBLICATIONS

Literature from Microscan Systems, Inc., Tukwila, Wash. on MS-1000 Laser Scanner.
Richard A. Zeine, Jr., "Bureau of Radiation Health (BRH) Report for Microscan MS1000 Scanner", Sep. 1, 1982.
Affidavit of Richard Zeine, Jul. 9, 1992, filed in Civ. Action 92-CV-6278T, U.S. Dist. Ct., W.D.N.Y.
Affidavit of Michael E. Mertel, Aug. 6, 1992, filed in Civ. Action 92-CV-6278T, U.S. Dist. Ct., W.D.N.Y.
Laser Scanner (Product Description of Model MS-1000 by Microscan), EDN, Dec. 17, 1982, pp. 319-320.

Primary Examiner—John Shepperd
Attorney, Agent, or Firm—Arnold, White & Durkee

[57] ABSTRACT

A portable laser diode scanning head, aimable at each symbol to be read, emits and receives non-readily-visible laser light, and is equipped with a trigger-actuated aiming light arrangement for visually locating and tracking each symbol. A compact laser diode optical train and an optical folded path assembly, as well as an interchangeable component design and an integral window construction for the head also are disclosed. Also disclosed is an optic means mounted in the laser diode scanning head including a focusing lens and an aperture stop for forming the emitted laser light to have a beam cross-section of an altered size within a working distance range.

51 Claims, 5 Drawing Sheets

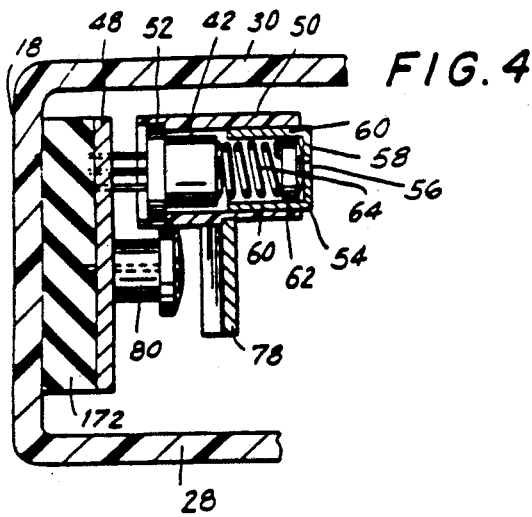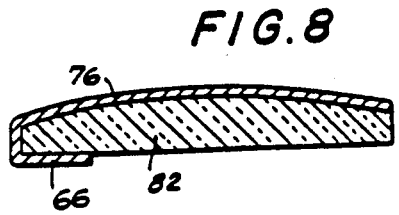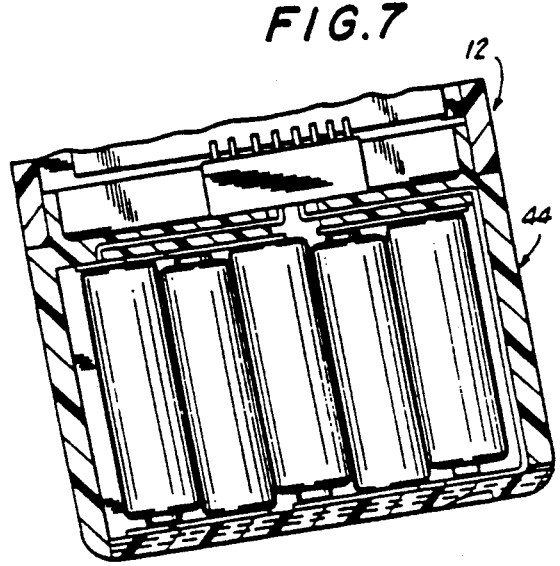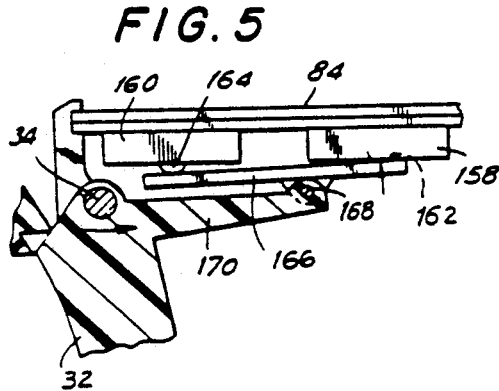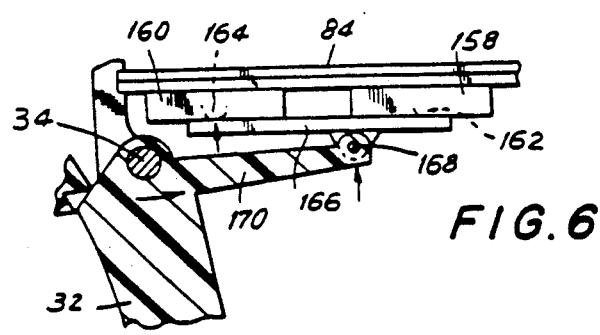

PORTABLE LASER DIODE SCANNING HEAD HAVING A FOCUSING LENS AND AN APERTURE

This application is a continuation of application Ser. No. 454,144, filed Dec. 21, 1989, now U.S. Pat. No. 5,021,641, issued Jun. 4, 1991, which was a division of Ser. No. 295,151, filed Jan. 9, 1989, now U.S. Pat. No. 4,897,532, issued Jan. 30, 1990, which was a continuation of application Ser. No. 148,669, filed Jan. 26, 1988, now U.S. Pat. No. 4,825,057, issued Apr. 25, 1989, which was a division of application Ser. No. 706,502, filed Feb. 28, 1985, now abandoned. The following continuing applications were also based upon application Ser. No. 706,502: application Ser. No. 148,438, filed Jan. 26, 1988, now U.S. Pat. No. 4,806,742, issued Feb. 21, 1989; application Ser. No. 113,898, filed Oct. 29, 1987, now U.S. Pat. No. 4,760,248, issued Jul. 26, 1988; application Ser. No. 230,746, filed Aug. 9, 1988, now U.S. Pat. No. 4,835,374, issued May 30, 1989, and co-pending application Ser. No. 690,702, filed Apr. 24, 1991.

BACKGROUND OF THE INVENTION

1. Field of the Invention

The present invention generally relates to laser scanning systems for reading symbols such as bar code symbols and, more particularly, to a lightweight, multi-component, portable laser diode scanning head supportable by a user and aimable at each symbol to be read. Still more particularly, this invention relates to an aiming light arrangement for visually locating and, in some cases, tracking each symbol to be read when the head emits and/or receives light which is not readily visible and is, in effect, invisible to the user; to a trigger which controls the aiming light arrangement; to a laser diode optical assembly; to an optical element which reflects an aiming light beam but transmits non-readily-visible light; to a multi-purpose scanning/collecting/focusing mirror of one-piece construction; to an interchangeable component design, wherein one or more components, as desired, are receivable in a single handle of the head, or in interchangeable handles which are detachably mountable to the head; and to a light-blocking cover which overlies selected transparent portions of the head to prevent light from passing therethrough.

2. Description of the Prior Art

Various optical readers and optical scanning systems have been developed heretofore to optically read bar code symbols applied to objects in order to identify the object by optically reading the symbol thereon. The bar code symbol itself is a coded pattern comprised of a series of bars of various widths, and spaced apart from one another to bound spaces of various widths, said bars and spaces having different light-reflecting characteristics. The readers and scanning systems electro-optically decoded the coded pattern to a multiple alpha-numerical digit representation descriptive of the object. Scanning systems of this general type have been disclosed, for example, in U.S. Pat. Nos. 4,251,798; 4,360,798; 4,369,361; 4,387,297; 4,409,470 and 4,460,120, all of which have been assigned to the same assignee as the instant application.

As disclosed in some of the above patents, a particularly advantageous embodiment of such a scanning system resided, inter alia, in emitting a laser light beam from a hand-held, portable laser scanning head which was supported by a user, aiming the head and, more particularly, the laser light beam, at a symbol to be read, repetitively scanning the laser beam in a series of scans across the symbol, detecting the scanned laser light which is reflected off the symbol, and decoding the detected reflected light. Inasmuch as the laser light beam was usually, but not always generated by a helium-neon gas laser which emitted red laser light at a wavelength of about 6328 Angstrom units, the red laser light was visible to the user and, thus, the user, without difficulty, could properly aim the head and position and maintain the emitted red laser light on and across the symbol during the scanning.

However, in the event that the laser light beam was generated by a semiconductor laser diode, as, by way of example, see U.S. Pat. Nos. 4,387,297; 4,409,480 and 4,460,120, then the aiming of the head relative to the symbol was rendered more difficult when the laser diode emitted laser light which was not readily visible to the user. For some laser diodes, the laser light was emitted at a wavelength of about 7800 Angstrom units, which was very close to infrared light and was on the borderline of being visible. This laser diode light was visible to the user in a darkened room, but not in a lit environment where ambient light tended to mask out the laser diode light. Furthermore, if the laser diode light was moving, for example, by being swept across the symbol, and especially if the laser diode light was being swept at fast rates of speed on the order of a plurality of times per second, for example, at a rate of 40 scans per second, then the laser diode light was not visible to the user, even in a darkened room. Hence, due to one or more of such factors as the wavelength of the laser light, the intensity of the laser light, the intensity of the ambient light in the environment in which the laser light was operating, the scanning rate, as well as other factors, the laser diode light was rendered, in effect, "invisible", or, as alternatively defined herein and in the claims, as being "non-readily visible".

This non-readily-visible laser diode light did not enable the user, however, to readily aim the laser diode light at the symbol, at least not without a great deal of difficulty and practiced effort because, simply put, the user could not see the laser diode light. The user, therefore, was required to hunt around by trial and error, hope that the scanning laser diode light was eventually properly positioned on and across the symbol, and wait until the scanning system advised him, typically by the lighting of an indicator lamp or by the sounding of an auditory beeper, that the symbol had indeed been successfully decoded and read. This hunting technique was a less-than-efficient and time-consuming procedure for reading symbols, particularly in those applications where a multitude of symbols had to be read every hour and every day.

Nevertheless, in the context of a laser scanning head which was desired to be made as lightweight, miniature, efficient, inexpensive and easy to use as possible, the laser diode was more advantageous than the helium-neon gas laser, despite the non-readily-visible laser diode light characteristic, because the laser diodes were smaller, were lighter in weight, had reduced power requirements (voltage supplies on the order of 12 v DC or less), were directly modulated for synchronous detection and for increased signal-to-noise ratios, etc., as compared to such gas lasers.

However, despite the above advantages, certain optical properties of the laser diode beam itself, aside from its invisibility, did not readily enable the laser diode beam to be focused to a desired spot size (e.g. a 6 to 12 mils circular spot) at a given reference plane exteriorly of the head, and to maintain said spot size within specified tolerances at either side of the reference plane within a predetermined depth of focus or field, i.e. the working distance in which a symbol located anywhere within the field can be successfully decoded and read. For example, the longer wavelength of the laser diode beam, as compared to that of the helium-neon gas laser, dictated a shorter working distance for the same spot size. The laser diode beam was also highly divergent, diverged differently in different planes, and was non-radially symmetrical. Thus, whereas the gas laser beam had the same small divergence angle of about one milliradian in all planes perpendicular to the longitudinal direction of beam propagation, the laser diode beam had a large divergence angle of about 200 milliradians in the plane parallel to the p-n junction plane of the diode, and a different larger divergence angle of about 600 milliradians in the plane perpendicular to the p-n junction. In the single transverse mode ($TEM_{oo}$), the gas laser beam had a radially symmetrical, generally circular cross-section, whereas the laser diode beam had a non-radially-symmetrical, generally oval cross-section.

By way of example, in a so-called geometrical approach to solve the aforementioned focusing problem, and ignoring the non-radially symmetrical nature of the laser diode beam, optical magnification factors in excess of 80 were obtained if one wished to focus the beam spot to have about a 9.5 mil spot diameter at a reference plane located about 3½" from the head. However, such high magnification factors dictated that, if one optical focusing element were employed (e.g. see U.S. Pat. No. 4,409,470), it would have to be critically manufactured, positioned and adjusted. If one employed several optical focusing elements in a lens system designed with a large numerical aperture, i.e. on the order of 0.25, as suggested by U.S. Pat. No. 4,387,297 to accept a large divergent laser diode beam and to distribute the magnification among the elements, then the mechanical tolerances for each element would be looser, and the positioning and adjustment procedures would be easier. However, a multiple, as opposed to a single, optical element design occupied more space within, and increased the weight and expense, of the head.

Also, although an oval laser diode beam spot was, in certain cases, desirable in ignoring voids in, and dust on, the symbol, as well as in rendering the light-dark transitions more abrupt, as compared to a circular gas laser beam spot during a scan across a symbol, these advantageous features occurred when the longer dimension of the oval spot was aligned along the height of the symbol. Thus, to obtain such desirable features, the laser diode beam had to be correctly aligned in a certain orientation relative to the symbol. In a situation where the symbols were oriented in a random manner relative to the laser diode beam, the head had to be frequently manipulated to correctly orient the laser diode beam on the symbol, and this further aggravated the already-less-than-efficient and time-consuming procedure for reading symbols, particularly on a mass basis, with laser diode light. Although it was possible to circularize the oval laser diode beam spot using an anamorphic collimator, this further increased the number of optical elements, the space, the weight and the expense.

Still another drawback inherent in earlier laser scanning heads, both of the gas laser and laser diode type, was that they were not readily adaptable to different applications. Different end users had different requirements. Whereas one user might want the electronic circuitry for decoding the detected reflected light to data descriptive of the symbol, and for controlling the decoding, to be mounted in the head, another user would require this electronic circuitry to be located remotely from the head. Still other users had different requirements concerning whether or not to locate a rechargeable power source or a data storage either locally in, or remote from, the head. Thus, the prior laser scanning systems had, more or less, to be custom-made for each user, and this was not altogether desirable in terms of manufacturing or marketing. Also, if the user wished to change the system requirements, the user had to forego the change, or obtain another system.

Yet another disadvantage associated with earlier laser scanning heads was that each had a discrete light-transmissive window mounted thereon. The discrete window was a separate piece which had to be glued in place and, hence, over time, the window sometimes became free of its glued mounting, particularly if the head was frequently subjected to mechanical shock and abuse. Once the window became disengaged, moisture, dust and other such contaminants were free to enter the interior of the head, thereby coating the optics and the electronic circuitry therein, and possibly interfering with their intended operation.

SUMMARY OF THE INVENTION

1. Objects of the Invention

It is a general object of this invention to overcome the above-described drawbacks of the prior art laser scanning systems.

It is another object of this invention to enable a user to readily aim a head and, more particularly, to direct at a symbol a non-readily-visible laser light beam emitted from the head at, and/or to collect non-readily-visible reflected laser light reflected from, the symbol.

It is a further object of this invention to enable a user to readily aim a non-readily-visible laser beam emitted by a semiconductor laser diode on and across a symbol prior to and during a scan of the symbol.

Yet another object of this invention is to eliminate the trial-and-error hunting techniques, particularly at long working distances, in aiming a semiconductor laser diode beam at a symbol.

Still another object of this invention is to increase the efficiency and reduce the time involved in optically reading a symbol with a semiconductor laser diode beam.

A still further object of this invention is to accurately locate a symbol with a semiconductor laser diode-based scanner prior to a scan, and to accurately track the symbol with the semiconductor laser diode-based scanner during the scan.

Another object of the invention is to readily enable a highly divergent, non-radially symmetrical, long wavelength, semiconductor laser diode beam having a generally oval beam cross-section to be focused to a desired beam spot size at a given reference plane exteriorly of the head, and maintained at said spot size within specified tolerances at either side of the reference plane within a predetermined depth of field without requiring a single high-precision, high-magnification optical focusing element to be manufactured or precisely positioned relative to the diode, and without requiring multiple optical focusing elements to occupy increased space within the head.

Another object of the invention is to provide an efficient and compact optical folded path assembly within the head having a novel optical element for reflecting an aiming light beam, but for transmitting a semiconductor laser diode beam, and also having a novel one-piece multi-purpose scanning mirror, collecting mirror and focusing mirror.

A further object of the invention is to provide a multi-position, manually-depressible trigger for controlling the operation of an aiming light arrangement, as well as that of the laser scanning system.

Still another object of the invention is to provide a modular design for the components in the head, wherein different components are receivable in either a single handle, or in readily interchangeable handles, mounted on the head, for readily adapting the head to different requirements of different users.

Yet another object of the invention is to provide a very lightweight, streamlined, compact, hand-held, fully portable, easy-to-manipulate, non-arm-and-wrist-fatiguing laser diode scanning head and/or system supportable entirely by a user during the optical reading of symbols, especially black and white symbols used in industrial applications, but also bar code symbols of the type known as the Universal Product Code (UPC).

An additional object of the invention is to seal the interior of a head from contaminants.

2. Features of the Invention

In keeping with these objects and others which will become apparent hereinafter, one feature of the invention resides, briefly stated, in an aiming light arrangement for use in aiming a hand-held laser scanning head in a laser scanning system for reading symbols at which the head is aimed. Several components are conventionally mounted in the head. For example, means, e.g. a semiconductor laser diode or possibly a gas laser, are provided within the head for generating an incident laser beam. Optic means, e.g. a positive lens, a negative lens, reflecting mirrors, or other optical elements, are also provided within the head for optically modifying, i.e. forming, and directing the incident laser beam along a first optical path toward a reference plane located exteriorly of the head and lying in a plane generally perpendicular to the direction of propagation of the incident laser beam, and to a symbol located in a working distance range in the vicinity of the reference plane. For convenience, a symbol that is located between the reference plane and the head is defined hereinafter as a "close-in" symbol, whereas a symbol that is located on the other side of the reference plane away from the head is defined as a "far-out" symbol.

Laser light is reflected off the symbol, and at least a returning portion of said reflected laser light travels along a second optical path away from the symbol back toward the head. Scanning means, e.g. a scanning motor having a reciprocally-oscillatable output shaft on which a reflecting surface such as a scanning mirror is mounted, are mounted in the head for scanning the symbol in a scan, and preferably at a plurality of sweeps per second, across the symbol in a repetitive manner. The returning portion of the reflected laser light has a variable light intensity across the symbol during the scan which is due, in the case of a bar code symbol, to the different light-reflective characteristics of the bars and spaces which constitute the symbol.

The head also comprises sensor means, e.g. one or more photodiodes, for detecting the variable light intensity of the returning portion of the reflected laser light over a field of view, and for generating an electrical analog signal indicative of the detected variable light intensity. Signal processing means are also mounted in the head for processing the analog electrical signal, and usually for processing the analog signal to a digitized electrical signal, which can be decoded to data descriptive of the symbol being scanned. The scanning means is operative for scanning either the incident laser beam itself across the symbol, or the field of view of the sensor means, or both.

Sometimes, but not always, decode/control electronic circuitry is provided locally in, or remotely from, the head. The decode/control electronic circuitry is operative for decoding the digitized signal to the aforementioned data, for determining a successful decoding of the symbol, and for terminating the reading of the symbol upon the determination of the successful decoding thereof. The reading is initiated by actuation of a manually-actuatable trigger means provided on the head, and operatively connected to, and operative for actuating, the laser beam generating means, scanning means, sensor means, signal processing means, and decode/control means. The trigger means is actuated once for each symbol, each symbol in its respective turn. In a preferred embodiment, the actuation of the trigger means causes the actuation of the decode/control means which, in turn, causes the actuation of the laser beam generating means scanning means, sensor means and signal processing means.

In conventional usage, the head, which is supported by a user in his or her hand, is aimed at each symbol to be read, and once the symbol is located, the user actuates the trigger means to initiate the reading. The decode/control means automatically alerts the user when the symbol has been read so that the user can turn his or her attention to the next symbol, and repeat the reading procedure.

As noted above, a problem arises when the incident laser beam or the reflected laser light are not readily visible, which can occur due to one or more of such factors as the wavelength of the laser light, the laser light intensity, the ambient light intensity, the scanning rate, as well as other factors. Due to such "invisibility", the user cannot see the laser beam and does not know readily when the invisible laser beam is positioned on the symbol, or whether the scanning laser beam is scanning over the entire length of the symbol.

Hence, in accordance with this invention, the aiming light arrangement assists the user visually to locate, and aim the head at, each symbol when such non-readily-visible laser light is employed. The aiming light arrangement includes means including an actuatable aiming light source, e.g. a visible light emitting diode, mounted in the head, and operatively connected to the trigger means, and operative, when actuated by the trigger means, for generating an aiming light beam whose light is readily visible to the user; and aiming means, also mounted in the head, for directing the aiming light beam along an aiming light path from the aiming light source toward the reference plane and to each symbol in turn, visibly illuminating at least a part of the respective symbol and thereby locating the latter for the user. The aiming light path lies within, and preferably extends parallel to, either the first optical path or the second optical path, or both, in the portion of such paths which lie exteriorly of the head. Thus, the user is assisted in correctly aiming the head at the respective symbol to be read.

In one advantageous embodiment, the aiming light arrangement directs a single aiming light beam to each symbol to illuminate thereon a generally circular spot region within the field of view, and preferably near the center of the symbol. It is further advantageous if this single spot region remains stationary or static during the scanning of the symbol so that both close-in and far-out symbols can be seen and located by the user, both prior to and during the scan. However, one drawback associated with such static single beam aiming is that the user cannot track the linear scan of the scanning beam across the symbol during the scan. In other words, the user does not know where the ends of the laser scans are and, hence, does not know whether the linear scan is extending across the entire length of the symbol, or is tilted relative thereto.

In another advantageous embodiment, the aiming light arrangement directs a pair of aiming light beams to each symbol to illuminate thereon a pair of generally circular spot regions that are within, and spaced apart of each other along, the field of view. Preferably, the two spot regions are located at, or near, the ends of the linear scan, as well as remaining stationary or static during the scanning of the symbol so that both close-in and far-out symbols not only can be seen and located by the user both prior to and during the scan, but also can be tracked during the scan. However, one drawback associated with such static twin beam aiming is that two aiming light sources and associated optics are required, and this represents increased system complexity, weight, size and expense.

In still another advantageous embodiment, the aiming light arrangement directs a single aiming light beam to a reciprocally oscillating focusing mirror operative to sweep the aiming light across each symbol to illuminate thereon a line region extending along the field of view. Such dynamic single beam aiming is advantageous because close-in symbols can be more readily seen, located and tracked, as compared to static aiming. However, one drawback associated with such dynamic aiming is that far-out symbols cannot readily be seen, located or tracked, particularly when the focusing mirror is being swept at high scan rates on the order of 40 scans per second, due to the inherently reduced intensity of the light collected by the human eye.

In a further advantageous embodiment, the aiming light arrangement directs a single aiming light beam to a focusing mirror which has a stationary state and a reciprocally oscillating state. Initially, the aiming light beam is reflected off the stationary focusing mirror to each symbol to illuminate thereon a spot region within the field of view, preferably near the center of the symbol, prior to the scan of the symbol to locate the same. Thereupon, the focusing mirror is caused to reciprocally oscillate to reflect the aiming light beam to the symbol to sweep the aiming light beam across the symbol to illuminate thereon a line region extending along the field of view, thereby tracking the symbol. This combination static/dynamic aiming is very desirable because it enables a user to track a close-in symbol during the scan (which was not readily possible with only static single beam aiming), and also enables the user to at least locate a far-out symbol prior to the scan (which was not readily possible with only dynamic aiming). Since, in the majority of cases, the symbols to be read will be close-in symbols, the inability to track the far-out symbol in the combination static-dynamic aiming embodiment is not critical.

To implement such combination static/dynamic aiming, it is advantageous if the trigger means has multiple positions and is operatively connected, either directly or indirectly via the decode/control means, to the aiming light source, as well as the oscillatable focusing mirror. In a first position, or off state, for the trigger, all of the components in the head are deactivated. In a second position, or first operational state, the aiming light source is activated, and the focusing mirror is positioned in a predetermined stationary position, e.g. in a center position, for a predetermined time, so that the aiming beam can illuminate a center spot region of the symbol to be read. In a third position, or second operational state, all of the other components in the head, including those responsible for reciprocally oscillating the focusing mirror, are activated, thereby initiating the reading of the symbol and the illumination of a line region along the field of view.

All of the above aiming light arrangement embodiments are in direct contrast to those that were provided on wand or pen readers which were manually positioned on, or at a small distance from, a symbol, and thereupon which were manually dragged or moved across the symbol. Skilled users were generally required to effect the aforementioned movement because criticality in the manipulation of the angle of the pen relative to the symbol, the pen speed, the uniformity of the pen speed, and other factors was necessary. In any event, the manual reader only results, at best, in one scan per manual movement and, if the symbol was not successfully read on the first attempt, then the user had to repeat the manual scan again and again.

Another feature of this invention resides in the novel optic means for focusing the highly divergent, non-radially-symmetrical laser diode beam having a generally oval beam cross-section. Advantageously, the optic means comprises a focusing lens, e.g. a plano-convex lens, and an aperture stop located in the first optical path adjacent the focusing lens. The aperture stop may have a circular, rectangular or oval cross-section which is smaller than the beam cross-section at the aperture stop so as to permit a portion of the incident laser diode beam to pass through the aperture stop en route to the symbol. The walls bounding the aperture stop obstruct and prevent the remaining portion of the incident laser diode beam from passing through the aperture stop en route to the symbol. Such beam aperturing is in direct contrast to prior art designs, such as disclosed in U.S. Pat. No. 4,409,470, wherein the incident laser diode beam is deliberately permitted to travel unobstructedly through an aperture en route to the symbol. Such beam aperturing reduces the numerical aperture from large values on the order of 0.15 to 0.45 to a value below 0.05 and significantly decreases the optical magnification factor so that a single focusing lens can be used to achieve the aforementioned advantages associated therewith. Although such beam aperturing is at the expense of output power of the laser diode, the advantages achieved are well worth such expense, and sufficient output power remains in the portion of the incident laser diode beam that passes through the aperture stop to read the symbol.

Although the use of aperture stops is well known in optical systems, such beam aperturing is believed to be novel and unobvious in laser scanning systems for reading symbols. As previously mentioned, an aperture stop decreases the power in the portion of the incident laser diode beam that impinges the symbol and, as a general rule, a laser scanning system designer does not deliberately want to throw away power, particularly in that portion of the incident beam that impinges and scans the symbol, since less power is contained in the laser light reflected off and collected from the symbol.

In addition, it is well known that for a given cross-section of incident laser beam, the depth of focus in an optical system having an aperture stop shifts from that for an optical system which does not have an aperture stop. Since, as a general rule, a hand-held bar code laser scanning system designer wants as large a depth of focus as possible for a given spot size—so that the working distance is correspondingly as large as possible—the use of an aperture stop may be considered as something to be avoided.

It is also well known that the smallest laser beam spot size that can be theoretically obtained in an optical system having an aperture stop will be larger than that for an optical system which does not have an aperture stop. Hence, for those applications where a very small beam spot size is desired, one would not turn to using an aperture stop.

In an optical laser system which does not have an aperture stop, the laser beam spot cross-section has a gaussian brightness distribution characteristic. By contrast, when an aperture stop is employed, light diffraction causes light rings or fringes in the beam spot. Such light rings or fringes effectively cause the beam spot size to increase, as well as other undesirable effects. The undesirably increased beam spot size is still another reason why an aperture stop is not used in laser scanning systems.

On this latter point, the use of an aperture stop dictates that complex mathematics in accordance with general diffraction theory be employed to design the optical system. Since it is more often the case that laser scanning system designers work with gaussian beam mathematics, which is simpler than diffraction mathematics, this represents still another possible reason why the use of an aperture stop in a laser scanning system has not heretofore been proposed.

A particularly compact optical folded path assembly is achieved when an optical element such as a so-called "cold mirror" is utilized to reflect the visible aiming light beam to a collecting mirror of the sensor means, but to transmit therethrough the reflected laser diode light reflected by the symbol and collected by the collecting mirror. Still another efficient aspect of the overall optical assembly is to integrate the collecting mirror for the reflected laser light, together with the aforementioned scanning mirror for the incident laser diode beam, as well as with the aforementioned focusing mirror for the aiming light beam into a multi-purpose mirror of one-piece construction.

Another highly desirable feature is embodied in an interchangeable component design for the head so that a manufacturer can readily adapt the head to suit the particular requirements of each user. Thus, different components may be contained in a single handle for the head, or in a plurality of interchangeable handles for the head, thereby readily adapting the head to suit the user and eliminating the laborious custom-made heads of the prior art.

Still another advantageous feature resides in eliminating the mounting of a discrete window on the head, and preventing the possibility that such a window could become disengaged from its mounting and expose the interior of the head to moisture, dust and other contaminants which could, under certain conditions, affect the operation of the head. To this end, at least a portion of the head is made of a one-piece transparent material construction, and a cover of light-blocking material is arranged over the transparent portions of the head to block light from passing therethrough, but leaving other transparent portions of the head uncovered so that said other transparent portions may serve as the aforementioned window. It is further desirable to constitute the cover of a thick, cushionable, yieldable material such as rubber to provide a measure of shock resistance for the head.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWINGS

FIG. 4 is an enlarged sectional view taken on line 4—4 of FIG. 2;

FIG. 5 is an enlarged detail view showing the trigger assembly in a first operational state;

FIG. 6 is a view analogous to FIG. 5, but in a second operational state;

FIG. 7 is a view of a detachable battery pack accessory to the head of FIG. 1;

FIG. 8 is an enlarged sectional view of a one-piece scanning/collecting/focusing mirror component as taken along line 8—8 of FIG. 1;

DETAILED DESCRIPTION OF THE PREFERRED EMBODIMENTS

Figure 1:
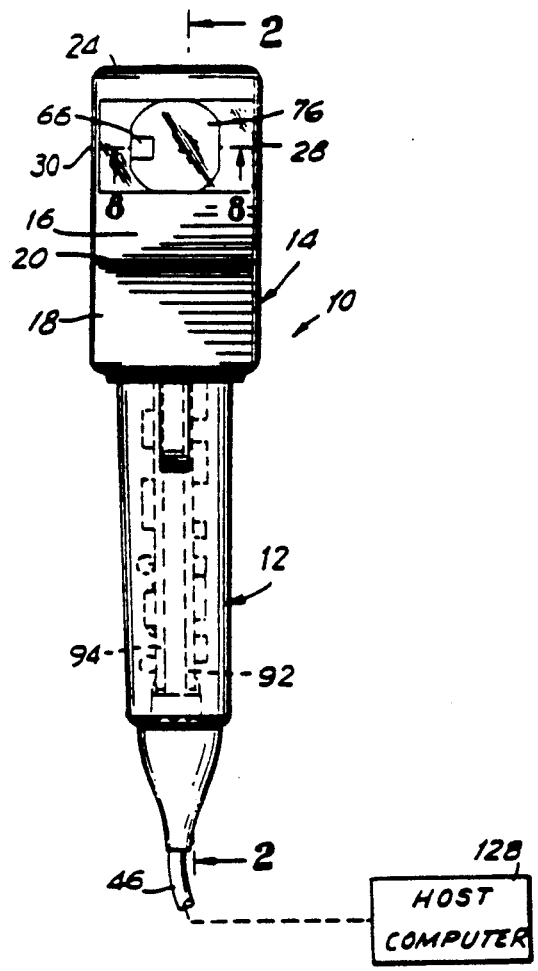
FIG. 1 is a front view of a portable laser diode scanning head in accordance with this invention.

Referring now to FIGS. 1-8 of the drawings, reference numeral 10 generally identifies a lightweight (less than one pound), narrow-bodied, streamlined, narrow-snouted, hand-held, fully portable, easy-to-manipulate, non-arm-and-wrist fatiguing laser scanning head supportable entirely by a user for use in a laser scanning system operative for reading, scanning and/or analyzing symbols, and aimable both prior to, and during, the reading thereof, by the user at the symbols, each symbol in its turn. The term "symbol", as used herein, is intended to cover indicia composed of different portions having different light-reflective properties at the wavelength of the light source, e.g. a laser, being utilized. The indicia may be the aforementioned black and white industrial symbols, e.g. Code 39, Codabar, Interleaved 2 of 5, etc., and also the omnipresent UPC bar code symbol. The indicia may also be any alphabetic and/or numeric characters. The term "symbol" is also intended to cover indicia located in a background field, wherein the indicia, or at least a portion thereof, have a different light-reflective property than that for the background field. In this latter definition, the "reading" of the symbol is of particular benefit in the fields of robotics and object recognition.

Figure 3:
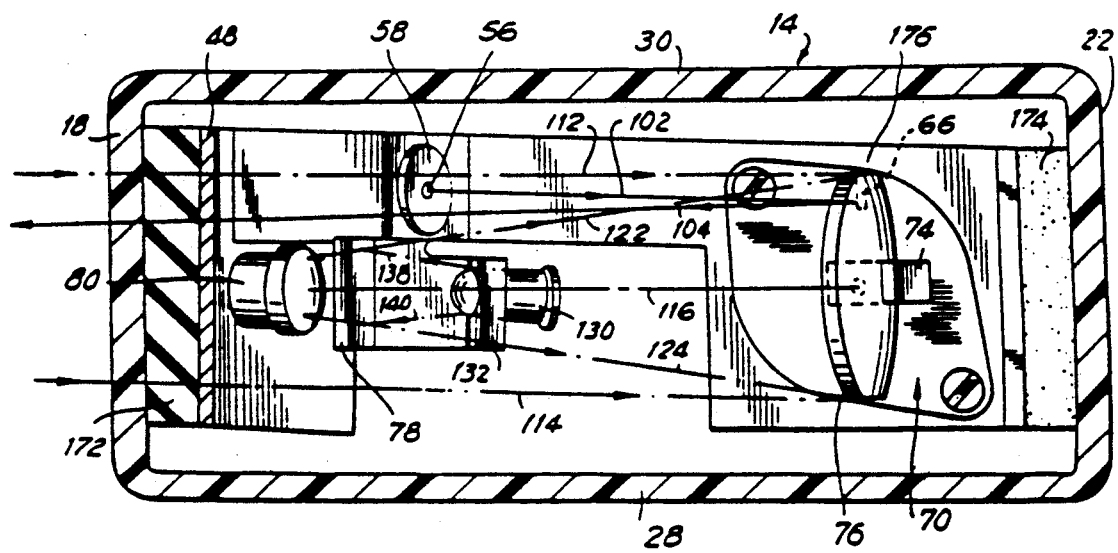
FIG. 3 is a section view taken on line 3—3 of FIG. 2.
Figure 2:
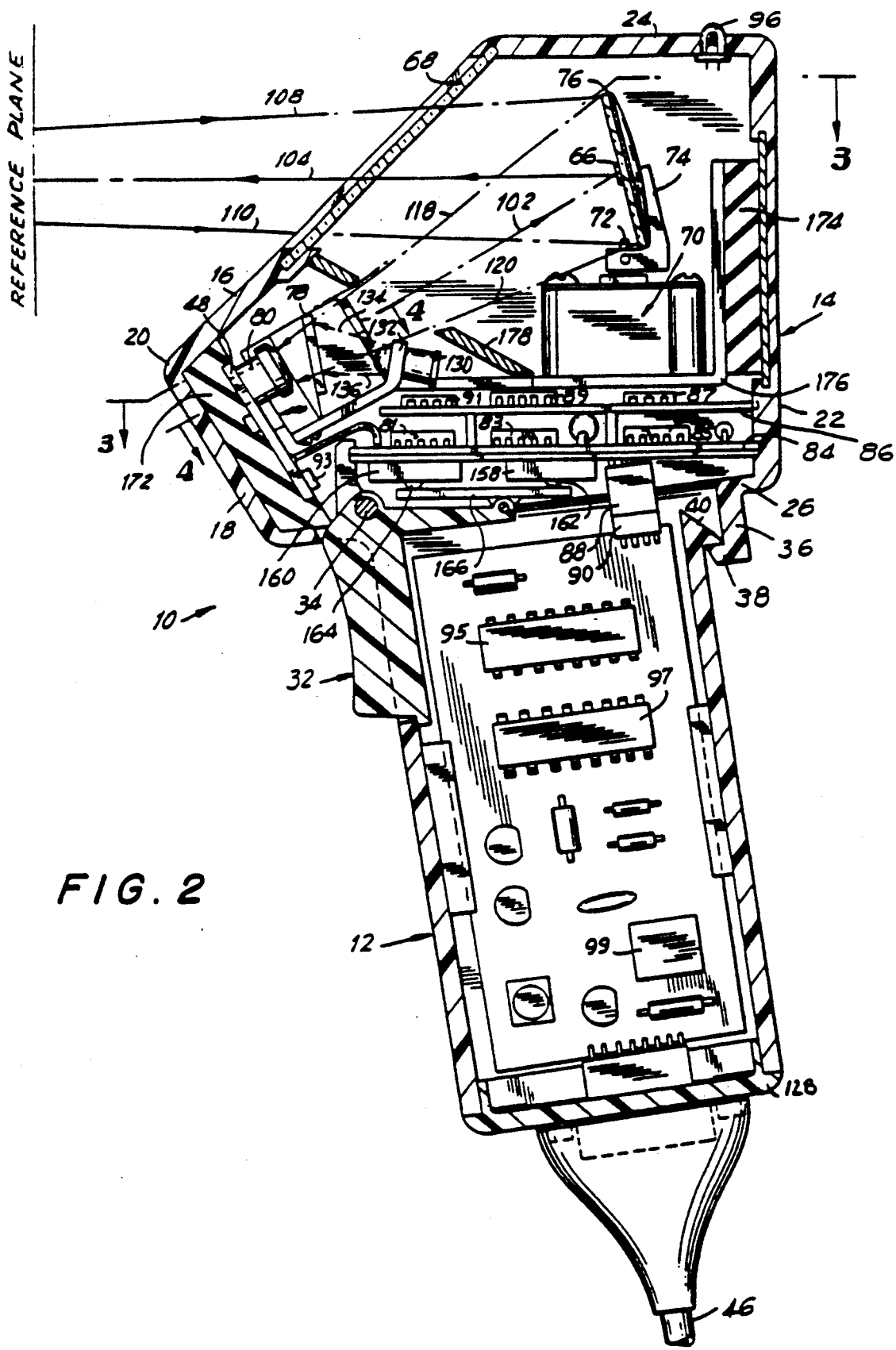
FIG. 2 is an enlarged cross-sectional view taken on line 2—2 of FIG. 1.

Turning now to FIGS. 1-3, the head 10 includes a generally gun-shaped housing having a handle portion 12 of generally rectangular cross-section and generally vertically elongated along a handle axis, and a generally horizontally elongated, narrow-bodied barrel or body portion 14. The cross-sectional dimension and overall size of the handle portion 12 is such that the head 10 conveniently can fit and be held in a user's hand. The body and handle portions are constituted of a lightweight, resilient, shock-resistant, self-supporting material, such as a synthetic plastic material. The plastic housing preferably is injection-molded, but can be vacuum-formed or blow-molded to form a thin, hollow shell which bounds an interior space whose volume measures less than a value on the order of 50 cubic inches and, in some applications, the volume is on the order of 25 cubic inches or less. Such specific values are not intended to be self-limiting, but to provide a general approximation of the overall maximum size and volume of the head 10.

As considered in an intended position of use as shown in FIGS. 1-3, the body portion 14 has a front prow region having an upper front wall 16 and a lower front wall 18 which forwardly converge toward each other and meet at a nose portion 20 which lies at the foremost part of the head. The body portion 14 also has a rear region having a rear wall 22 spaced rearwardly of the front walls 16, 18. The body portion 14 also has a top wall 24, a bottom wall 26 below the top wall 24, and a pair of opposed side walls 28, 30 that lie in mutual parallelism between the top and bottom walls.

A manually-actuatable, and preferably depressible, trigger 32 is mounted for pivoting movement about a pivot axis 34 on the head in a forwardly-facing region where the handle and body portions meet and where the user's forefinger normally lies when the user grips the handle portion in the intended position of use. The bottom wall 26 has a tubular neck portion 36 which extends downwardly along the handle axis, and terminates in a radially-inwardly extending collar portion 38 of generally rectangular cross-section. The neck and collar portions have a forwardly-facing slot through which the trigger 32 projects and is moved.

The handle portion 12 has a radially-outwardly extending upper flange portion 40 of generally rectangular cross-section which also has a forwardly-facing slot through which the trigger 32 projects and is moved. The upper flange portion 40 is resilient and deflectable in a radially-inward direction. When the upper flange portion 40 is inserted into the neck portion 36, the upper flange portion 40 bears against the collar portion 38 and is radially-inwardly deflected until the flange portion 40 clears the collar portion 38, at which time, the upper flange portion 40, due to its inherent resilience, snaps back to its initial undeflected position and engages behind the collar portion with a snap-type locking action. To disengage the handle portion from the body portion, the upper part of the handle portion is sufficiently deflected until the upper flange portion 40 again clears the collar portion, and thereupon the handle portion can be withdrawn from the neck portion 36. In this manner, handle portion 12 can be detachably snap-mounted and de-mounted from the body portion 14 and, as explained below, another handle portion from a set of interchangeable handle portions, each containing different components of the laser scanning system, may be mounted to the body portion to adapt the head 10 to different user requirements.

A plurality of components are mounted in the head and, as explained below, at least some of them are actuated by the trigger 32, either directly or indirectly, by means of a control microprocessor. One of the head components is an actuatable laser light source (see FIG. 4), e.g. a semiconductor laser diode 42, operative, when actuated by the trigger 32, for propagating and generating an incident laser beam whose light, as explained above, is "invisible" or non-readily visible to the user, is highly divergent, is non-radially symmetrical, is generally oval in cross-section, and has a wavelength above 7000, e.g. about 7800, Angstrom units. Advantageously, the diode 42 is commercially available from many sources, e.g. from the Sharp Corporation as its Model No. LTO20MC. The diode may be of the continuous wave or pulse type. The diode 42 requires a low voltage (e.g. 12 v DC or less) supplied by a battery (DC) source which may be provided within the head, or by a rechargeable battery pack accessory 44 (see FIG. 7) detachably mounted on the head, or by a power conductor in a cable 46 (see FIG. 2) connected to the head fran an external power supply (e.g. DC source).

As best shown in FIG. 4, the laser diode 42 is mounted on a printed circuitboard 48. An optical assembly is mounted in the head and adjustably positioned relative to the diode 42 for optically modifying and directing the incident laser beam along a first optical path toward a reference plane which is located exteriorly of the head, forwardly of the nose portion 20, and which lies generally perpendicular to the longitudinal direction along which the incident laser beam propagates. A symbol to be read is located in the vicinity of the reference plane, either at, or at one side, or at an opposite side, of the reference plane, that is, anywhere within the depth of focus or field of the optically modified incident laser beam, said depth of focus or field also being known as the working distance in which the symbol can be read. The incident laser beam reflects off the symbol in many directions, and that portion of the reflected laser light which travels along a second optical path away from the symbol back toward the head is known herein as the returning portion which, of course, also is non-readily visible to the user.

As best shown in FIG. 4, the optical assembly includes an elongated, cylindrical optical tube 50 having at one end region a cylindrical bore 52 in which an annular casing portion of the diode 42 is snugly received to hold the diode in a fixed position, and at the opposite end region of the optical tube 50 a lens barrel 54 is mounted for longitudinal movement. The lens barrel 54 includes an aperture stop 56, blocking wall portions 58 surrounding and bounding the aperture stop 56, and cylindrical side wall portions 60 which bound an interior space.

The optical assembly further includes a focusing lens 62, e.g. a plano-convex lens, located within the interior space of the side wall portions 60 in the first optical path, and operative for focusing the incident laser beam at the reference plane. The aperture stop 56 may be located on either side of the lens 62, but preferably on the downstream side. A biasing means or tensioned coil spring 64 is located within the optical tube, and has one coil end bearing against a casing portion of the diode, and another coil end bearing against a planar side of the lens 62. The spring 64 constantly urges the lens 62 against the blocking wall portions 58, thereby fixedly locating the lens 62 relative to the aperture stop 56. The lens 62 and aperture stop 56 are jointly moved when the lens barrel 54 is longitudinally moved. The side wall portions 60 are initially received in a threaded or sliding relationship with an inner circumferential wall bounding the optical tube 50, and are thereupon fixed, e.g. by glueing or clamping, to the inner circumferential wall when a desired longitudinal spacing between the lens 62 and the aperture stop 56, on the one hand, and the diode 42, on the other hand, has been obtained. The longitudinal movement between the side wall portions 60 and the inner circumferential wall of the tube 50 constitutes an adjustable positioning means for the lens 62 and the aperture stop 56, and the fixing in position of the lens and the aperture stop relative to the diode constitutes a means for fixedly locating the lens and the aperture stop at a predetermined spacing from the diode.

The aperture stop 56 has a cross-section which is smaller than the cross-section of the incident laser beam at the aperture stop 56, thereby permitting only a portion of the incident laser beam to pass through the aperture stop 56 downstream along the first optical path en route to the symbol. The blocking wall portions 58 obstruct the remaining portion of the incident laser beam, and prevent the remaining portion from passing through the aperture stop 56. The aperture stop cross-section preferably is circular for ease of manufacture, but also may be rectangular or oval, in which case, the longer dimension of the rectangular or oval cross-section is aligned with the larger divergence angle of the incident laser beam to transmit more energy to the symbol.

In accordance with diffraction optics law, the size of the required incident beam cross-section at the reference plane is determined, inter alia, by the size of the aperture stop, the wavelength of the incident beam, and the longitudinal distance between the lens 62 and the reference plane. Thus, assuming said wavelength and longitudinal distance remain the same, the beam cross-section at the reference plane can be easily controlled by controlling the size of the aperture stop cross-section. The placement of the aperture stop downstream, rather than upstream, of the lens 62 avoids also taking the tolerances of the lens into consideration upon determination of the beam cross-section at the reference plane.

The aperture stop 56 is positioned in the center of the laser diode beam so that the intensity of light is approximately uniform in the planes both perpendicular and parallel to the p-n junction, i.e. the emitter, of the diode 42. It will be noted that, due to the non-radial symmetry of the laser diode beam, the light intensity in the plane perpendicular to the p-n junction is brightest in the center of the beam and then falls off in the radially outward direction. The same is true in the plane parallel to the p-n junction, but the intensity falls off at a different rate. Hence, by positioning a preferably circular, small aperture in the center of a laser diode beam having an oval, larger cross-section, the oval beam cross-section at the aperture will be modified to one that is generally circular, and the light intensity in both of the planes perpendicular and parallel to the p-n junction approximately is constant. The aperture stop preferably reduces the numerical aperture of the optical assembly to below 0.05, and permits the single lens 62 to focus the laser beam at the reference plane.

In a preferred embodiment, the approximate distance between the emitter of the laser diode 42 and the aperture stop 56 ranges from about 9.7 mm to about 9.9 mm. The focal distance of the lens 62 ranges from about 9.5 mm to about 9.7 mm. If the aperture stop 56 is circular, then its diameter is about 1.2 mm. If the aperture stop 56 is rectangular, then its dimensions are about 1 mm by about 2 mm. The beam cross-section is about 3.0 mm by about 9.3 mm just before the beam passes through the aperture stop 56. These merely exemplificative distances and sizes enable the optical assembly to modify the laser diode beam and focus the same to have a beam cross-section of about 6 mils to about 12 mils at a reference plane which is about 3 inches to about 4 inches from the nose portion 20. The working distance is such that a close-in symbol, as previously defined, can be located anywhere from about 1 inch away from the nose portion 20 to the reference plane, and a far-out symbol, as previously defined, can be located anywhere from the reference plane to about 20 inches away from the same.

Figure 9:
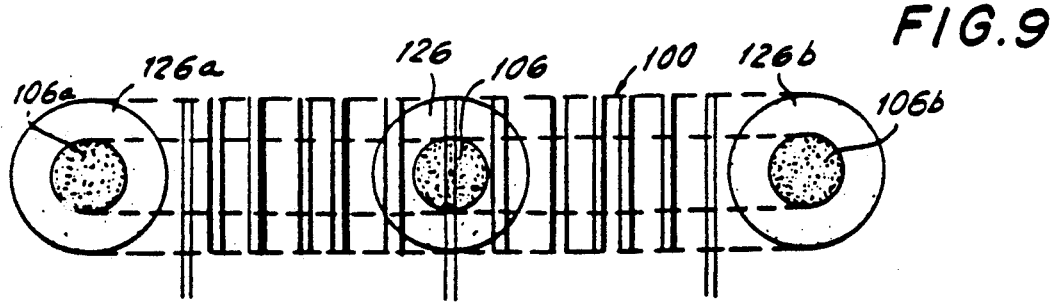
FIG. 9 is an enlarged view of a symbol and the parts thereof which are impinged upon, and reflected from, by laser light.

The portion of the incident laser beam that passed through the aperture stop 56 is directed rearwardly by the optical assembly along an optical axis 102 within the head to a generally planar scanning mirror 66 for reflection therefrom. The scanning mirror 66 forwardly reflects the laser beam impinging thereon along another optical axis 104 through a forwardly-facing, laser-light-transmissive window 68 mounted on the upper front wall 68, and to the symbol. As best shown in FIG. 9, a representative symbol 100 in the vicinity of the reference plane is shown and, in the case of a bar code symbol, is comprised of a series of vertical bars spaced apart of one another along a longitudinal direction. The reference numeral 106 denotes the generally circular, invisible, laser spot subtended by the symbol. The laser spot 106 in FIG. 9 is shown in an instantaneous position, since the scanning mirror 66, when actuated by the trigger 32, is, as explained below, reciprocally and repetitively oscillated transversely to sweep the incident laser beam lengthwise across all the bars of the symbol in a linear scan. The laser spots 106a and 106b in FIG. 9 denote the instantaneous end positions of the linear scan. The linear scan can be located anywhere along the height of the bars provided that all the bars are swept. The length of the linear scan is longer than the length of the longest symbol expected to be read and, in a preferred case, the linear scan is on the order of 5 inches at the reference plane.

The scanning mirror 66 is mounted on a scanning means, preferably a high-speed scanner motor 70 of the type shown and described in U.S. Pat. No. 4,387,397, the entire contents of said patent being incorporated herein by reference and made part of the instant application. For the purposes of this application, it is believed to be sufficient to point out that the scanner motor 70 has an output shaft 72 on which a support bracket 74 is fixedly mounted. The scanning mirror 66 is fixedly mounted on the bracket 74. The motor 70 is driven to reciprocally and repetitively oscillate the shaft 72 in alternate circumferential directions over arc lengths of any desired size, typically less than 360°, and at a rate of speed on the order of a plurality of oscillations per second. In a preferred embodiment, the scanning mirror 66 and the shaft 72 jointly are oscillated so that the scanning mirror 66 repetitively sweeps the incident laser diode beam impinging thereon through an angular distance or arc length at the reference plane of about 32° and at a rate of about 20 scans or 40 oscillations per second.

Referring again to FIG. 2, the returning portion of the reflected laser light has a variable light intensity, due to the different light-reflective properties of the various parts that comprise the symbol 100, over the symbol during the scan. The returning portion of the reflected laser light is collected by a generally concave, spherical collecting mirror 76, and is a broad conical stream of light in a conical collecting volume bounded, as shown in FIG. 2, by upper and lower boundary lines 108, 110, and, as shown in FIG. 3, by opposed side boundary lines 112, 114. The collecting mirror 76 reflects the collected conical light into the head along an optical axis 116 (see FIG. 3) along the second optical path through a laser-light-transmissive element 78 to a sensor means, e.g. a photosensor 80. The collected conical laser light directed to the photosensor 80 is bounded by upper and lower boundary lines 118, 120 (see FIG. 2) and by opposed side boundary lines 122, 124 (see FIG. 3). The photosensor 80, preferably a photodiode, detects the variable intensity of the collected laser light over a field of view which extends along, and preferably beyond, the linear scan, and generates an electrical analog signal indicative of the detected variable light intensity.

Referring again to FIG. 9, the reference numeral 126 denotes an instantaneous collection zone subtended by the symbol 100 and from which the instantaneous laser spot 106 reflects. Put another way, the photosensor 80 "sees" the collection zone 126 when the laser spot 106 impinges the symbol. The collecting mirror 76 is mounted on the support bracket 74 and, when the scanner motor 70 is actuated by the trigger 32, the collecting mirror 76 is reciprocally and repetitively oscillated transversely, sweeping the field of view of the photodiode lengthwise across the symbol in a linear scan. The collection zones 126a, 126b denote the instantaneous end positions of the linear scan of the field of view.

The scanning mirror 66 and the collecting mirror 76 are, in a preferred embodiment, of one-piece construction and, as shown in FIG. 8, are light-reflecting layers or coatings applied to a plano-convex lens 82 constituted of a light-transmissive material, preferably glass. The lens 82 has a first outer substantially planar surface on a portion of which a first light-reflecting layer is coated to constitute the planar scanning mirror 66, and a second outer generally spherical surface on which a second light-reflecting layer is coated to constitute the concave collecting mirror 76 as a so-called "second surface spherical mirror".

The scanning mirror 66 can also be a discrete, small planar mirror attached by glue, or molded in place, at the correct position and angle on a discrete, front surfaced, silvered concave mirror. As described below, the concave collecting mirror 76 serves not only to collect the returning portion of the laser light and to focus the same on the photodiode 80, but also to focus and direct an aiming light beam exteriorly of the head.

Also mounted in the head is a pair or more of printed circuitboards 84, 86 on which various electrical subcircuits are mounted. For example, signal processing means having components 81, 82, 83 on board 84 are operative for processing the analog electrical signal generated by the sensor 80, and for generating a digitized video signal. Data descriptive of the symbol can be derived from the video signal. Suitable signal processing means for this purpose was described in U.S. Pat. No. 4,251,798. Components 87, 89 on board 86 constitute drive circuitry for the scanner motor 70, and suitable motor drive circuitry for this purpose was described in U.S. Pat. No. 4,387,297. Component 91 on board 86 constitutes an aiming light controller subcircuit whose operation is described below. Component 93 on board 48, on which the diode 42 and sensor 80 are mounted, is a voltage converter for converting the incoming voltage to one suitable for energizing the laser diode 42. The entire contents of U.S. Pat. Nos. 4,251,798 and 4,387,297 are incorporated herein by reference and made part of the instant application.

The digitized video signal is conducted to an electrical interlock composed of a socket 88 provided on the body portion 14, and a mating plug 90 provided on the handle portion 12. The plug 90 automatically electromechanically mates with the socket 88 when the handle portion is mounted to the body portion. Also mounted within the handle portion are a pair of circuitboards 92, 94 (see FIG. 1) on which various components are mounted. For example, a decode/control means comprised of components 95, 97 and others are operative for decoding the digitized video signal to a digitized decoded signal from which the desired data descriptive of the symbol is obtained, in accordance with an algorithm contained in a software control program. The decode/control means includes a PROM for holding the control program, a RAM for temporary data storage, and a control microprocessor for controlling the PROM and RAM. The decode/control means determines when a successful decoding of the symbol has been obtained, and also terminates the reading of the symbol upon the determination of the successful decoding thereof. The initiation of the heading is caused by depression of the trigger 32. The decode/control means also includes control circuitry for controlling the actuation of the actuatable components in the head, as initiated by the trigger, as well as for communicating with the user that the reading has been automatically terminated as, for example, by sending a control signal to an indicator lamp 96 to illuminate the same.

The decoded signal is conducted, in one embodiment, along a signal conductor in the cable 46 to a remote, host computer 128 which serves essentially as a large data base, stores the decoded signal and, in some cases, provides information related to the decoded signal. For example, the host computer can provide retail price information corresponding to the objects identified by their decoded symbols.

In another embodiment, a local data storage means, e.g. component 95, is mounted in the handle portion, and stores multiple decoded signals which have been read. The stored decoded signals thereupon can be unloaded to a remote host computer. By providing the local data storage means, the use of the cable 46 during the reading of the symbols can be eliminated—a feature which is very desirable in making the head as freely manipulatable as possible.

As noted previously, the handle portion 12 may be one of a set of handles which may be interchangeably mounted to the body portion. In one embodiment, the handle portion may be left vacant, in which case, the video signal is conducted along the cable 46 for decoding in a remote decode/control means. In another embodiment, only the decode/control means may be contained within the handle portion, in which case, the decoded signal is conducted along the cable 46 for storage in a remote host computer. In still another embodiment, the decode/control means and a local data storage means may be contained within the handle portion, in which case, the stored decoded signals from a plurality of readings thereupon may be unloaded in a remote host computer, the cable 46 only being connected to unload the stored signal.

Alternatively, rather than providing a set of removable handles, a single handle can be non-detachably fixed to the head and, in this event, different components mounted on removable circuitboards 92, 94 may be provided, as desired, within the single handle by removing, and thereupon replacing, the removable handle end 128.

As for electrically powering the laser diode 42, as well as the various components in the head requiring electrical power, a voltage signal may be conveyed along a power conductor in the cable 46, and a converter, such as component 93, may be employed to convert the incoming voltage signal to whatever voltage values are required. In those embodiments in which the cable 46 was eliminated during the reading of the symbols, a rechargeable battery pack assembly 44 (see FIG. 7) is detachably snap-mounted at the bottom of the handle portion 12.

In further accordance with this invention, an aiming light arrangement is mounted within the head for assisting the user in visually locating, and in aiming the head at, each symbol to be read in its turn, particularly in the situation described above wherein the laser beam incident on, and reflected from, the symbol is not readily visible to the user. The aiming light arrangement comprises means including an actuatable aiming light source 130, e.g. a visible light-emitting diode (LED), an incandescent white light source, a xenon flash tube, etc., mounted in the head and operatively connected to the trigger 32. When actuated either directly be the trigger 32 or indirectly by the decode/control means, the aiming light 130 propagates and generates a divergent aiming light beam whose light is readily visible to the user, and whose wavelength is about 6600 Angstrom units, so that the aiming light beam generally is red in color and thus contrasts with the ambient white light of the environment in which the symbol is located.

Aiming means also are mounted in the head for directing the aiming light beam along an aiming light path from the aiming light source toward the reference plane and to each symbol, visibly illuminating at least a part of the respective symbol. More specifically, as best shown in FIGS. 2 and 3, the aiming light 130 is mounted on an inclined support 132 for directing the generally conical aiming light beam at the optical element 78. The conical aiming light beam is bounded by upper and lower boundary lines 134, 136 (see FIG. 2) and by opposed side boundary lines 138, 140 (see FIG. 3) en route to the optical element 78. As previously noted, the optical element 78 permits the collected laser light to pass therethrough to the photosensor 80, and filters out ambient light noise from the environment from reaching the photosensor. The optical element 78 also reflects the aiming light beam impinging thereon. The optical element is, in effect, a so-called "cold" mirror which reflects light in wavelengths in the range of the aiming light beam, but transmits light in wavelengths in the range of the laser light. The aiming light beam is reflected from the cold mirror 78 along an optical axis which is substantially colinear with the optical axis 116 of the collected laser light between the collecting mirror 76 and the photosensor 80, and impinges on the concave mirror 76 which serves to focus and forwardly reflect the aiming light beam along an optical axis which is substantially colinear with the same optical axis of the collected laser light between the concave mirror 76 and the symbol 100. The concave mirror 76 which serves as a focusing mirror for the aiming light beam focuses the same to about a one-half inch circular spot size at a distance about 8 inches to about 10 inches from the nose 20 of the head. It will be noted that the portion of the aiming light path which lies exteriorly of the head coincides with the portion of the collected laser light path which lies exteriorly of the head so that the photosensor 80, in effect, "sees" the non-readily-visible laser light reflected from that part of the symbol that has been illuminated, or rendered visible, by the aiming light beam. In another variant, the aiming light beam could have been directed to the symbol so as to be coincident with the outgoing incident laser beam by placing a cold mirror in the first optical path and directing the aiming light beam at the cold mirror so that the optical axis of the aiming light beam is coincident with that of the outgoing incident laser beam.

Figure 10:
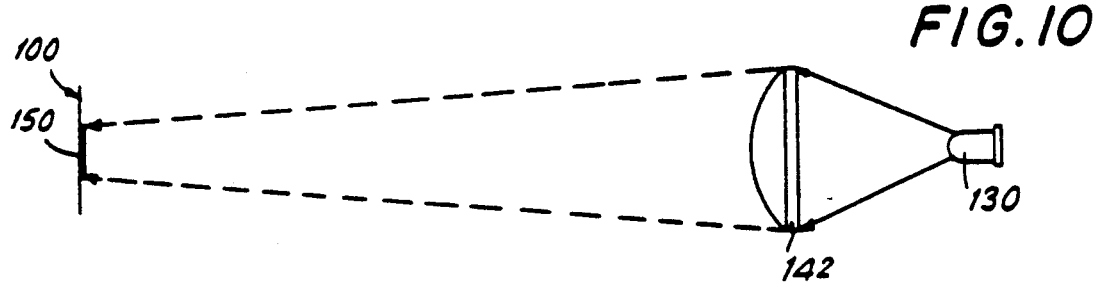
FIG. 10 is a schematic view of a static single beam aiming arrangement.

As shown in FIG. 10, the aiming LED 130 may, in a first static single beam aiming embodiment, be positioned relative to a stationary directing element 142, e.g. a focusing lens, stationarily mounted in the aiming light path within the head. The lens 142 is operative for focusing and directing the aiming light beam to the respective symbol 100, visibly illuminating thereon a spot region 150 (see also FIG. 11) within the field of view. The spot region 150 preferably is circular, near the center of the symbol, and is illuminated both prior to the scan to locate the symbol before the reading thereof, and during the scan during the reading thereof. Both close-in and far-out symbols can be located and seen by the static single beam aiming embodiment of FIG. 10, the far-out symbols, due to their greater distance from the head, being illuminated to a lesser intensity, but visible, nevertheless, by the user. However, as explained previously, the fixed spot 150 provides little assistance in terms of tracking the scan across the symbol.

Figure 12:
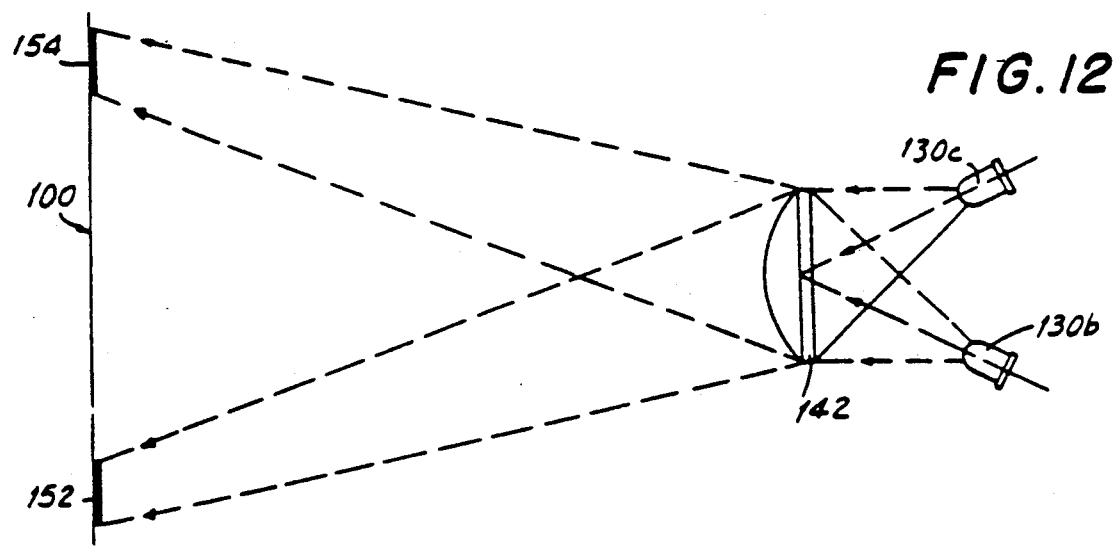
FIG. 12 is a schematic view of a static twin beam aiming arrangement.

Turning next to a second static twin beam aiming embodiment, as shown in FIG. 12, a pair of aiming LEDs 130a, 130b, identical to aiming LED 130, are angularly positioned relative to the stationary focusing lens 142 which, in turn, is operative to direct the aiming light beams of both LEDs 130a, 130b to the same respective symbol, visibly illuminating thereon a pair of spot regions 152, 154 that are within, and spaced linearly apart of each other along the field of view. The spot regions 152, 154 preferably are circular, near the ends of the scan, and are illuminated both prior to and during the scan to locate and track the respective symbol both before and during the reading thereof. Both close-in and far-out symbols can be located and seen by the static twin beam aiming embodiment of FIG. 12, the far-out symbols, due to their greater distance from the head, being illuminated to a lesser intensity, but visible, nevertheless, by the user. As explained previously, the pair of fixed spots 152, 154 provide valuable assistance in terms of tracking the scan across the symbol.

Figure 11:
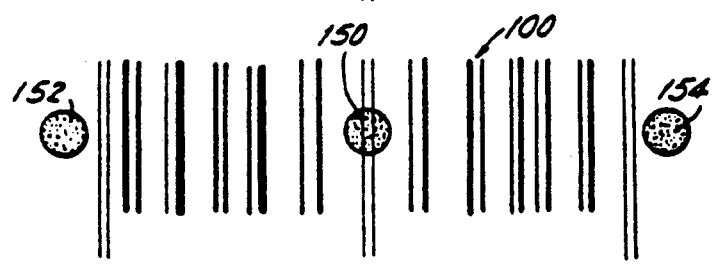
FIG. 11 is an enlarged view of a symbol and the parts thereof which are illuminated by static single beam, or by twin beam aiming.
Figure 13:
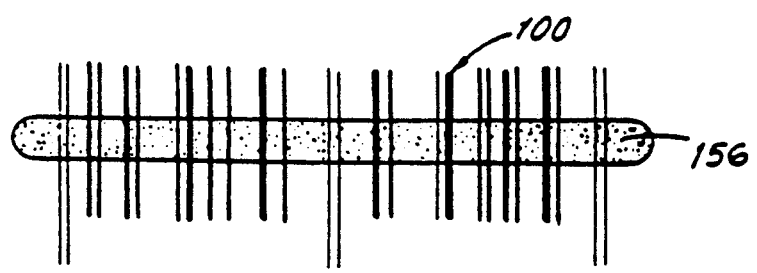
FIG. 13 is an enlarged view of a symbol and the parts thereof which are illuminated by a dynamic single beam aiming.

Turning next to a third dynamic single beam aiming embodiment, and with the aid of FIG. 11, rather than stationarily mounting the focusing lens 142 in the head, the lens 142 may be oscillated in the manner described previously for the scanning/collecting/focusing component to sweep the aiming light beam across the respective symbol, illuminating thereon a line region 156 (see FIG. 13) extending along the field of view. The line region 156 is illuminated during the scan to track the respective symbol during the reading thereof. Close-in symbols are well illuminated by the line region 156, even when the scan is performed at rates of 40 scans per second; however, for far-out symbols, the greater the distance from the head and the faster the scan rate, the less visible is the line region 156.

Returning to FIGS. 1–6, a combination static/dynamic aiming arrangement is shown which is actuated by the trigger 32 among various positions or states. In FIG. 2, the trigger 32 is shown in an off state, wherein all the actuatable components in the head are deactivated. A pair of electrical switches 158, 160 are mounted on the underside of board 84. Each switch 158, 160 has a spring-biased armature or button 162, 164 which, in the off state, extend out of the switches and bear against opposite end regions of a lever 166 which is pivoted at a center-offset position at pivot point 168 on a rear extension 170 of the trigger 32.

When the trigger 32 is initially depressed to a first initial extent, as shown in FIG. 5, the lever 166 depresses only the button 162, and the depressed switch 158 establishes a first operational state in which the trigger 32 actuates the aiming light 130 whose aiming light beam is thereupon reflected rearwardly off cold mirror 78 and reflected forwardly off the focusing mirror 76 to the symbol. In said first operational state, the trigger has also positioned the focusing mirror 76 in a predetermined stationary position. The stationary focusing mirror 76 directs the aiming light beam to the symbol, visibly illuminating thereon a spot region, identical to central spot region 150 in FIG. 11, within the field of view prior to the scan to assist the user in locating the symbol before the reading thereof. The stationary positioning of the focusing mirror 76 is advantageously accomplished by energizing a DC winding of the scanner motor 70 so that the output shaft and the focusing mirror 76 mounted thereon are angularly turned to a central reference position.

Thereupon, when the trigger 32 is depressed to a second further extent, as shown in FIG. 6, the lever 166 depresses not only the button 162, but also the button 164, so that a second operational state is established. In said second operational state, the trigger actuates all the remaining actuatable components in the head, e.g. the laser diode 42, the control circuitry of the scanner motor 70 which causes the focusing mirror 76 to oscillate, the photodiode 80, the signal processing circuitry, as well as the other circuitry in the head, to initiate a reading of the symbol. The focusing mirror 76 no longer is stationary, but is being oscillated so that the aiming light beam dynamically is swept across the symbol, visibly illuminating thereon a line region, identical to line region 156 in FIG. 13, extending along the field of view. Hence, during the scan, the user is assisted in tracking the symbol during the reading thereof. Such symbol tracking is highly visible for close-in symbols, but less so for far-out symbols.

The aforementioned sequential actuation of the components in the head could also be done with a single two-pole switch having built-in sequential contacts.

Returning to FIG. 1, it will be noted that many of the various components in the head are shock-mounted by a front shock isolator 172 on which the board 48 and all the components thereon are supported, and by a rear shock isolator 174 on which a support plate 176 on which the scanner motor 70 and the aiming light 130 are supported. A light baffle 178 subdivides the interior of the body portion and assists the cold mirror 78 in preventing stray ambient light from reaching the photosensor 80.

The laser scanning head of FIG. 2 is of the retroreflective type wherein the outgoing incident laser beam, as well as the field of view of the sensor means, are scanned. It will be readily understood that other variants also are within the spirit of this invention. For example, the outgoing incident laser beam can be directed to, and swept across, the symbol through one window on the head, while the field of view is not scanned and the returning laser light is collected through another window on the head. Also, the outgoing incident beam can be directed to, but not swept across, the symbol, while the field of view is scanned.

A variety of housing styles and shapes dictated by such considerations as esthetics, environment, size, choice and placement of electronic and mechanical components, required shock resistance both inside and outside the housing, may be employed in place of the housing shown in the drawings.

The laser scanning head of this invention need not be hand-held, but can also be incorporated in a desk-top, stand-alone workstation in which the symbol is passed through the workstation, preferably underneath an overhead window or port through which the outgoing incident laser beam is directed. Although the workstation itself is stationary, at least during the scanning of the symbol, the symbol is movable relative to the workstation and must be registered with the outgoing beam and, for this purpose, the aiming light arrangement described herein is particularly advantageous.

It should be noted that the laser scanning head of this invention can read high-, medium- and low-density bar code symbols within approximate working distance ranges of 1" to 6", 1" to 12", and 1" to 20", respectively. As defined herein, the high-, medium- and low-density bar code symbols have bars and/or spaces whose smallest width is on the order of 7.5 mils, 15–20 mils and 30–40 mils, respectively. In the preferred embodiment, the position of the reference plane for a symbol of a known density is optimized for the maximum working distance for that symbol.

To assist the user in aiming the head at the symbol, in addition to the aiming light arrangements described herein, other means may be provided. For example, a mechanical aiming means such as a raised sighting element formed on an upper portion of the housing and extending along the direction of the first or second optical path may be sighted along by the user. A viewport having a sight window may also be located on the head to enable the user to look through the sight window and thereby visually locate the symbol in the window. A sonic ranging means can also be used for finding the symbol. The ranging means emits a sonic signal, detects a returning echo signal, and actuates an auditory indicator upon such detection. The auditory indicator can sound a tone or change the rate of a series of sounds or beeps, thereby signaling the user that the symbol has been found.

In another aspect of this invention, it is sometimes desirable to cause the aforementioned aiming light spots on the symbol to blink, e.g. for the purpose of making the spots easier to see, or to reduce the average power consumed by the aiming light sources. Such blinking light spots can be effected by electrical and/or mechanical means.

Figure 14:
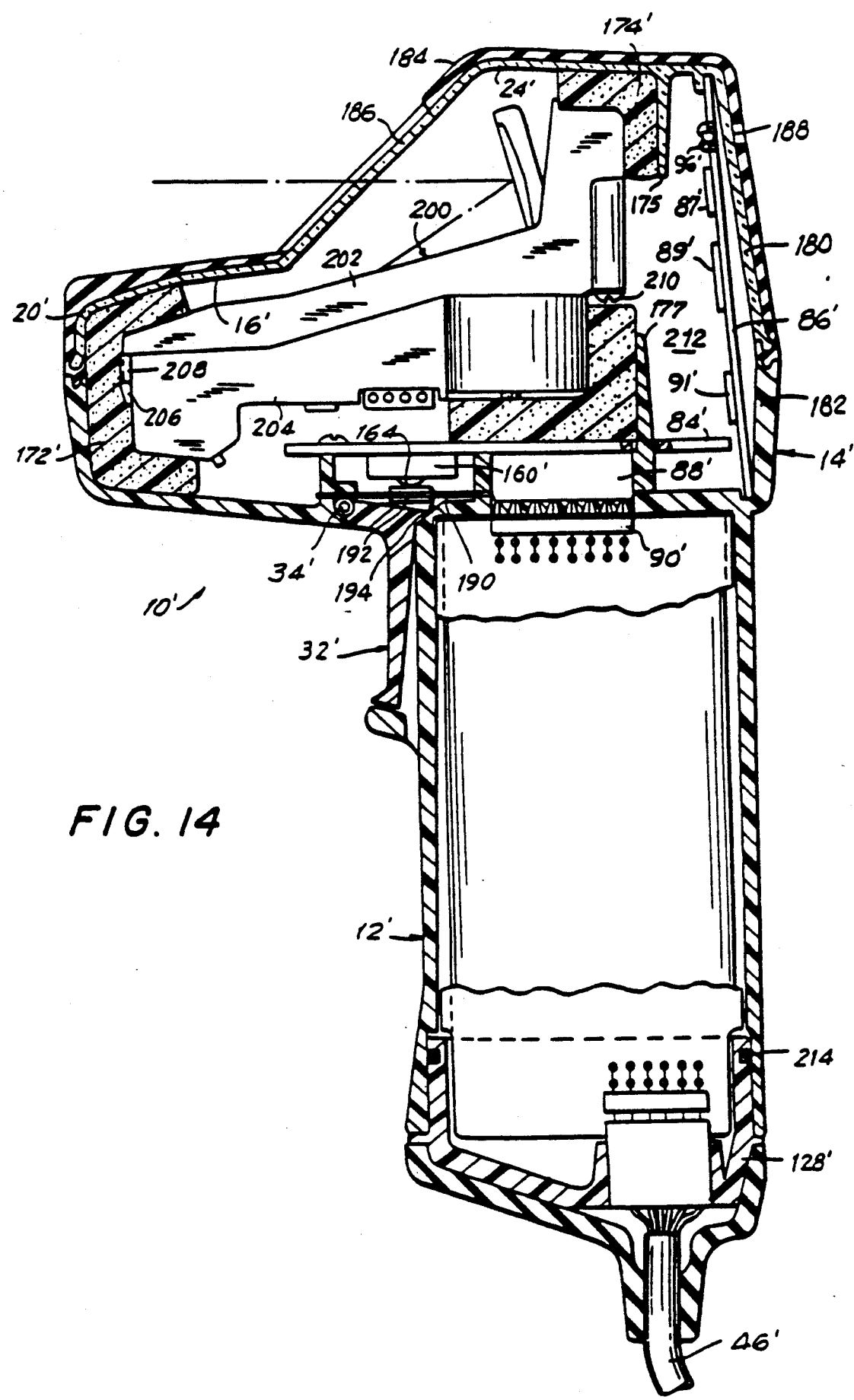
FIG. 14 is a view analogous to FIG. 2, but of a currently preferred commercial embodiment of the head in accordance with this invention.

FIG. 14 is analogous to FIG. 2, and illustrates a currently preferred commercial embodiment of the laser scanning head. For the sake of brevity, like parts in FIG. 14 have been identified by primed numerals as compared to corresponding parts in FIG. 2.

As for the differences between the FIG. 2 and FIG. 14 embodiments, one important distinction shown for the head 10' in FIG. 14 is that the body portion 14' is composed of two housing portions, namely, upper housing 180 and lower housing 182, which are assembled together, preferably by a snap-fit engagement. The lower housing 182 is constituted of a light-blocking opaque material such as colored synthetic plastic material, but the upper housing 180 is constituted of a light-transmissive transparent synthetic plastic material. Since both the outgoing light and the incoming light can pass through the transparent upper housing 180, a cover 184 of light-blocking material covers the entire exterior surface of the transparent upper housing 180, except for a window region 186 and an indicator region 188. The cover 184 is constituted of an injection-molded thermoset rubber-like material whose interior surface closely matches and conforms to the outer surface of the upper housing 180 so as to be in intimate contact with the entire exterior surface thereof and to be frictionally held thereon. The snugly fitting cover, in effect, masks all the portions of the transparent upper housing 180, other than the window region 186 and the indicator region 188, and prevents any outgoing light or incoming light from passing therethrough.

Thus, it is no longer necessary, as in prior art heads, to separately glue or mount a discrete window in place on the head. The uncovered window region 186 serves as the window for both outgoing and incoming light. The uncovered window region 186 is, of course, of a one-piece construction with the remainder of the upper housing 180 and, hence, no longer does the possibility exist, as in the prior art, that a window could become free of its mounting and permit dust, moisture and other such contaminants from coating or interfering with the proper operation of the optics and the electrical components within the head.

In addition, the indicator region 188 is not covered by the cover 184, so that light from the indicator lamp 96' can shine therethrough. Again, the prior art necessity to mount a separate window at the region of the indicator lamp 96' has been eliminated, thereby further contributing to the very effective sealing of the interior of the head.

The rubber-like cover is preferably thick, cushionable and yieldable, and provides a measure of shock-resistance for the head. It further will be noted from FIG. 14 that the cover has bent-under flanges at the region of the juncture between the upper and lower housings 180, 182 to provide a very effective gasket-like seal.

Still another difference between the FIG. 2 and FIG. 14 embodiments is the provision of a sealing diaphragm 190 in the region of the trigger 32'. The sealing diaphragm 190 has a central actuator 192, one surface of which engages button 164' of switch 160'. The opposite surface of the actuator 192 engages a ramp portion 194 of the trigger 32'. In operation, whenever the trigger is manually depressed, the ramp portion 194 urges the actuator 192 into engagement with the button 164' to actuate the switch 160'. During this operation, the diaphragm 190 isolates the interior of the head from the exterior thereof in the region of the trigger, thereby closing off another avenue through which dust, contaminants, moisture, etc. could otherwise freely enter as in the prior art.

Still another distinction between the FIG. 2 and FIG. 14 embodiments is that the laser diode, the optical assembly, the aiming light and the motor portion of the scanner motor are all mounted within and on a common support also known as an optical cradle 200. The cradle 200 has an upper part 202 and a lower part 204 which are assembled together as follows. At the front end of the cradle, a projection 206 on the upper part 202 is passed through and snappingly engages behind a recess 208 formed in a channel provided on the lower part 204. At the rear of the cradle, a threaded fastener 210 passes through a clearance hole in lower part 204 and threadedly engages a threaded hole formed in the upper part 202. The front shock isolator 172' is located between the front of the housing and the front of the cradle 200, and the rear shock isolator 174' is located between the rear of the cradle and inwardly-extending partitions 175,177 provided at the rear of the head.

Still another difference lies in mounting the printed circuitboard 86' not above the printed circuitboard 84', but, instead, in a rearwardly-extending compartment 212 formed between the aforementioned partitions 175, 177 and the rear wall of the body portion 14'.

Another difference lies in the provision of an O-ring seal 214 mounted in an annular groove formed at the inner end region of the handle insert 128'.

It will be understood that each of the elements described above, or two or more together, also may find a useful application in other types of constructions differing from the types described above.

While the invention has been illustrated and described as embodied in a portable laser diode scanning head, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A laser scanning head for reading bar-coded symbols, comprising:

(a) an actuatable laser diode mounted in the head for generating an incident laser beam of relatively low power, the laser diode having a p-n junction as the emitter of the laser beam;

(b) optic means mounted in the head for forming and directing the incident laser beam along a first optical path toward a reference plane located exteriorly of the head and to a symbol located in a working range in the vicinity of the reference plane, the laser beam reflecting off the symbol and returning along a second optical path back towards the head; the optic means including a focusing lens and an aperture stop both located in the first optical path in the immediate vicinity of the laser light source for forming the incident laser beam to have a beam cross-section of an altered size and shape within the working range, the focusing lens being located between the aperture stop and the laser light source;

the aperture stop defining a shaped opening which in cross-section is smaller than the beam cross-section at the aperture stop to permit a portion of the incident light beam to pass through the aperture stop and to directly determine the beam's size and shape within the working range, such cross-section being measured in the direction perpendicular to said p-n junction;

(c) a scanner mounted in the head for scanning the laser beam across the symbol, the returning portion of the laser light having a variable intensity over the scan;

(d) a sensor mounted in the head for detecting the variable intensity of the returning portion of the laser light, and for generating a sensor signal representative of the detected variable light intensity;

(e) a signal processor mounted in the head for processing the sensor signal and for generating a processed signal indicative of characteristics of the symbol; and (f) an actuator mounted in the head for actuating the laser light source.

2. The head as recited in claim 1 wherein the actuator comprises a manually-actuatable trigger.

3. The head as recited in claim 1 and including a housing for integrally supporting the aperture stop, the focusing lens, and the laser light source.

4. The head as recited in claim 1 wherein the scanner includes an electrically driven motor.

5. The head as recited in claim 1 wherein the scanner includes at least one mirrored surface and an electrically driven motor coupled to move the mirrored surface.

6. The head as recited in claim 5 wherein the motor is driven to reciprocally oscillate the mirrored surface.

7. The head as recited in claim 6 wherein the mirrored surface is flat.

8. The head as recited in claim 6 wherein the mirrored surface is curved.

9. The head as recited in claim 1 and including a decoder for decoding the processed signal.

10. The head as recited in claim 1 wherein the decoder is mounted within said head.

11. The head as recited in claim 1 wherein the head includes a housing adapted to be held in the hand.

12. The head as recited in claim 1 wherein the incident laser beam has a non-radially symmetric cross-section, and wherein the aperture stop has a radially symmetrical cross-section and modifies the non-radially symmetrical beam cross-section to one which is radially symmetrical at the reference plane.

13. The head as recited in claim 1 wherein the incident laser beam has a non-radially symmetric cross-section, and wherein the aperture stop has a non-radially symmetrical cross-section and modifies the non-radially symmetrical beam cross-section to one which is of a predetermined non-symmetry at the reference plane.

14. The head according to claim 1 wherein the laser light source includes a laser diode which produces a beam having a first cross-sectional size and shape at a place in the region of the aperture stop and wherein the aperture stop is configured to modify the first shaped beam to have a different size and shape at the reference plane.

15. The head according to claim 1 wherein the laser light source includes a solid state laser diode.

16. The head as recited in claim 15 wherein the optical means includes means for adjustably and jointly positioning the lens and the aperture stop at a predetermined spacing from the diode.

17. The head as recited in claim 1 wherein said aperture stop and said focusing means cooperate to provide a numeric aperture on the order of 0.05.

18. The head as recited in claim 1 wherein the beam-passing cross-sectional area of the aperture stop is on the order of 1-2 square millimeters.

19. The head as recited in claim 1 wherein the focal distance of the focusing lens is on the order of 9.5 to 9.7 millimeters.

20. The laser scanning head according to claim 1 wherein said cross-section is measured in both parallel and perpendicular directions with respect to said p-n junction.

21. An optical system for reading coded symbols, comprising:

(a) means including a solid state laser diode for generating a wide-angle, low power laser beam, the laser diode having a p-n junction as the emitter of the laser beam; and (b) optical means for optically forming and directing the laser beam along an optical path to different light-reflective indicia portions of a coded symbol for reflection therefrom, said optic means including a single focusing lens and an aperture stop located in the optical path in the immediate vicinity of the focusing lens between the laser light source and the light-reflective indicia portions, for focusing the laser beam to have a beam cross-section of a predetermined size within a working distance range, said aperture stop being located downstream of the lens and having a shaped cross-section which is smaller than the beam cross-section at the aperture stop to permit a part of the beam to pass through the aperture stop en route to the indicia portions, said cross-section of the aperture stop directly determining said pre-determined size of the beam cross-section, said aperture stop being bounded by a blocking wall for obstructing the remaining part of the beam from passing through the aperture stop en route to the indicia portions, such cross-section being measured in the direction perpendicular to said p-n junction.

22. The optical system as recited in claim 1 wherein the laser beam has a non-radially symmetrical cross-section, and wherein the aperture stop has a radially symmetrical cross-section and modifies the non-radially symmetrical beam cross-section to one which is radially symmetrical at the reference plane.

23. The optical system as recited in claim 1 wherein the laser beam has a non-radially symmetrical cross-section, and wherein the aperture stop has a non-radially symmetrical cross-section and modifies the non-radially symmetrical beam cross-section to one which is of a predetermined non-symmetry at the reference plane.

24. The optical system of claim 21 wherein the laser light source is a semiconductor diode and the optical means further includes a means for adjustability and jointly positioning the lens and the aperture stop at a predetermined spacing from the diode.

25. The optical system of claim 21 wherein the focusing means includes a single focusing lens having a curved surface.

26. The optical system of claim 21 wherein the focusing means includes a single focusing lens having a plano-convex configuration.

27. The optical system of claim 21 wherein the focusing means includes a single focusing lens having a flat surface.

28. The optical system of claim 21 wherein the cross-section of the aperture stop is circular.

29. The optical system of claim 21 wherein the cross-section of the aperture stop is rectangular.

30. The optical system of claim 21 wherein the cross-section of the aperture stop is oval.

31. The optical system according to claim 21 wherein said laser beam from the laser light source to the focusing means and aperture stop is substantially uncollimated.

32. The optical system according to claim 21 wherein said aperture stop and said focusing means cooperate to provide a numeric aperture on the order of 0.05.

33. The optical system according to claim 21 wherein the laser light source comprises a semiconductor laser diode.

34. The optical system according to claim 21 wherein the laser light source includes a laser diode which produces a beam having a first cross-sectional size and shape, and wherein the aperture stop is configured to modify such first shaped beam to have a different size and shape at the reference plane.

35. The optical system according to claim 21 wherein the laser light source includes a laser diode which produces a beam having a non-circular shape in cross-section, and wherein the aperture stop is configured to modify such non-circular shaped beam to have a substantially circular shape of reduced size at the reference plane.

36. The optical system according to claim 21 wherein the beam-passing cross-section of said aperture stop is on the order of about 1 mm to 2 mm.

37. The optical system according to claim 21 wherein the beam-passing cross-sectional area of the aperture stop is approximately 1 square millimeter to 2 square millimeters.

38. The optical system according to claim 37 wherein the aperture stop is about 9.7 mm to about 9.9 mm from the laser light source.

39. The optical system of claim 21 wherein the focusing means defines a numeric aperture of less than 0.05.

40. The optical system of claim 21 wherein the laser beam is substantially uncollimated when it strikes the focusing lens.

41. The optical system of claim 21 wherein the focal distance of the focusing lens is about 9.5 to 9.7 mm.

42. The optical system of claim 21 wherein the aperture stop is about 9.7 mm to about 9.9 mm from the laser light source.

43. The optical system according to claim 21 wherein said cross-section is measured in both parallel and perpendicular directions with respect to said p-n junction.

44. A laser scanning head for reading bar-coded symbols, comprising:
(a) an actuatable laser diode mounted in the head for generating an incident laser beam of relatively low power, the laser diode having a p-n junction as the emitter of the laser beam;
(b) optic means mounted in the head for forming and directing the incident laser beam along a first optical path toward a reference plane located exteriorly of the head and to a symbol located in a working range in the vicinity of the reference plane, the laser beam reflecting off the symbol and returning along a second optical path back towards the head;
the optic means including a focusing lens and an aperture stop both located in the first optical path in the immediate vicinity of the laser light source for forming the incident laser beam to have a beam cross-section of an altered size and shape within the working range, the focusing lens being located between the aperture stop and the laser light source;
the aperture stop defining a shaped opening which in cross-section is smaller than the beam cross-section at the aperture stop to permit a portion of the incident light beam to pass through the aperture stop and to directly determine the beam's size and shape within the working range, such cross-section being measured in the direction parallel to said p-n junction;
(c) a scanner mounted in the head for scanning the laser beam across the symbol, the returning portion of the laser light having a variable intensity over the scan;
(d) a sensor mounted in the head for detecting the variable intensity of the returning portion of the laser light, and for generating a sensor signal representative of the detected variable light intensity;
(e) a signal processor mounted in the head for processing the sensor signal and for generating a processed signal indicative of characteristics of the symbol; and
(f) an actuator mounted in the head for actuating the laser light source.

45. A laser scanning head for reading bar-coded symbols, comprising:
(a) an actuatable laser light source of low power mounted in the head for generating an incident laser beam of relatively low power;
(b) optic means mounted in the head for forming and directing the incident laser beam along a first optical path toward a reference plane located exteriorly of the head and to a symbol located in a working range in the vicinity of the reference plane, the laser beam reflecting off the symbol and returning along a second optical path back towards the head;
the optic means including a focusing lens and an aperture stop both located in the first optical path in the immediate vicinity of the laser light source for forming the incident laser beam to have a beam cross-section of an altered size and shape within the working range, the focusing lens being located between the aperture stop and the laser light source;
the aperture stop defining a shaped opening which in cross-section is smaller than the beam cross-section at the aperture stop to permit a portion of the incident light beam to pass through the aperture stop and to directly determine the beam's size and shape within the working range;
(c) a scanner mounted in the head for scanning the laser beam across the symbol, the returning portion of the laser light having a variable intensity over the scan;
(d) a sensor mounted in the head for detecting the variable intensity of the returning portion of the laser light, and for generating a sensor signal representative of the detected variable light intensity;
(e) a signal processor mounted in the head for processing the sensor signal and for generating a processed signal indicative of characteristics of the symbol; and
(f) an actuator mounted in the head for actuating the laser light source.

46. The laser scanning head according to claim 45 wherein the laser light source is a laser diode having a p-n junction for emitting the laser light, and wherein the cross-section is measured in the direction perpendicular to said p-n junction.

47. The laser scanning head according to claim 45 wherein the laser light source is a laser diode having a p-n junction for emitting the laser light, and wherein the cross-section is measured in both parallel and perpendicular directions with respect to said p-n junction.

48. An optical system for reading coded symbols, comprising:
(a) means including a solid state laser diode for generating a wide-angle, low power laser beam the laser diode having a p-n junction as the emitter of the laser beam; and
(b) optical means for optically forming and directing the laser beam along an optical path to different light-reflective indicia portions of a coded symbol for reflection therefrom, said optic means including a single focusing lens and an aperture stop located in the optical path in the immediate vicinity of the focusing means lens between the laser light source and the light-reflective indicia portions, for focusing the laser beam to have a beam cross-section of a predetermined size within a working distance range, said aperture stop being located downstream of the lens and having a shaped cross-section which is smaller than the beam cross-section at the aperture stop to permit a part of the beam to pass through the aperture stop en route to the indicia portions, said cross-section of the aperture stop directly determining said pre-determined size of the beam cross-section, said aperture stop being bounded by a blocking wall for obstructing the remaining part of the beam from passing through the aperture stop en route to the indicia portions, such cross-section being measured in the direction parallel to said p-n junction.

49. An optical system for reading coded symbols, comprising:
(a) means including a solid state laser light source for generating a wide-angle, low power laser beam; and
(b) optical means for optically forming and directing the laser beam along an optical path to different light-reflective indicia portions of a coded symbol for reflection therefrom, said optic means including a single focusing lens and an aperture stop located in the optical path in the immediate vicinity of the focusing lens between the laser light source and the light-reflective indicia portions, for focusing the laser beam to have a beam cross-section of a predetermined size within a working distance range, said aperture stop being located downstream of the lens and having a shaped cross-section which is smaller than the beam cross-section at the aperture stop to permit a part of the beam to pass through the aperture stop en route to the indicia portions, said cross-section of the aperture stop directly determining said pre-determined size of the beam cross-section, said aperture stop being bounded by a blocking wall for obstructing the remaining part of the beam from passing through the aperture stop en route to the indicia portions.

50. The optical system according to claim 49 wherein the laser light source is a laser diode having a p-n junction for emitting the laser light, and wherein said cross-section is measured in both parallel and perpendicular directions with respect to said p-n junction.

51. The optical system according to claim 49 wherein the laser light source is a laser diode having a p-n junction for emitting the laser light, and wherein said cross-section is measured in the direction perpendicular to said p-n junction.

* * * * *

UNITED STATES PATENT AND TRADEMARK OFFICE
CERTIFICATE OF CORRECTION

PATENT NO. : 5,247,162
DATED : Sept. 21, 1993
INVENTOR(S) : Swartz, et al

It is certified that error appears in the above-indentified patent and that said Letters Patent is hereby corrected as shown below:

On title page, item [54] and col. 1, line 2, after "APERTURE" insert --STOP--.

Column 17, line 48, change "be" to --by--.

Signed and Sealed this

Twenty-sixth Day of July, 1994

Attest:

BRUCE LEHMAN

Attesting Officer     Commissioner of Patents and Trademarks